June 29, 1926.
F. LOCKYER
1,590,981
LOCKING DEVICE FOR IGNITION SWITCHES
Filed Feb. 26, 1925
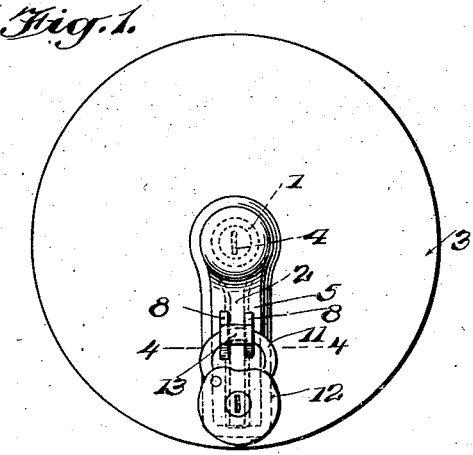
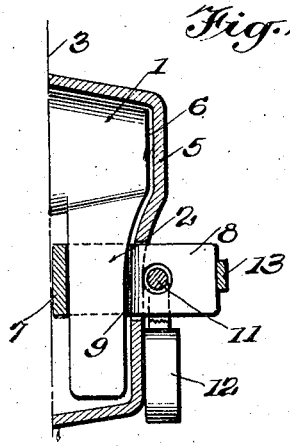
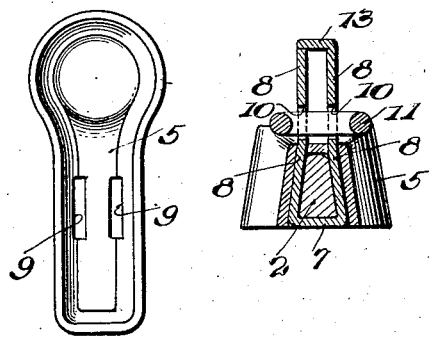
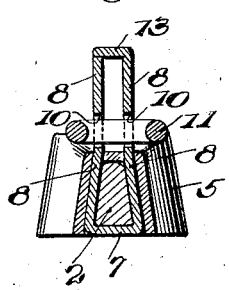
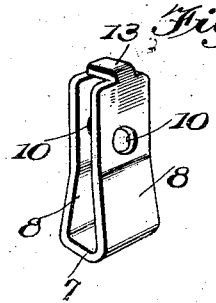
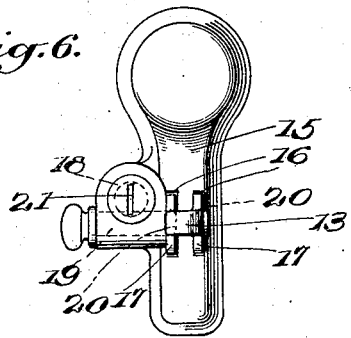
WITNESSES
INVENTOR
Frank Lockyer
BY
ATTORNEYS Patented June 29, 1926.

UNITED STATES PATENT OFFICE.

FRANK LOCKYER, OF SALT LAKE CITY, UTAH, ASSIGNOR TO IDEAL AUTO LOCK MANUFACTURING COMPANY, A CORPORATION OF UTAH.

LOCKING DEVICE FOR IGNITION SWITCHES.

Application filed February 26, 1925. Serial No. 11,779.

My invention is an improvement in locking devices for an automobile ignition switch of conventional construction, and it consists in the combinations, constructions and arrangements herein described and claimed.

An object of the invention is the provision of a simple, reliable and efficient device which is adapted to be quickly and easily placed in operative position with respect to an automobile ignition switch of conventional construction without the use of any tools and without any changes in the ordinary construction of the ignition switch and which when in operative position will effectually prevent the insertion of a key or like instrument in the usual key hole of the ignition switch and therefore will prevent operation of the ignition switch by an unauthorized person.

A further object of the invention is the provision of a device of the character described which is adapted to be locked in operative position so that it is practically impossible for an unauthorized person to remove it but which when unlocked can be conveniently and easily detached from the ignition switch to permit operation of the latter in the usual manner.

A further object of the invention is the provision of a device of the character described that is in accordance with all known requirements of municipal and like regulations which are designed to cover the use of locking devices for automobiles.

A still further object of the invention is the provision of a device of the character described that is economical to manufacture, not likely to get out of order easily, and thoroughly practical commercially.

Other objects and advantages of the invention will be apparent from the following description, considered in conjunction with the accompanying drawings in which—

Figure 1 is a face view showing a conventional automobile ignition switch equipped with a locking device embodying the invention.

Figure 2 is a vertical section through the locking device, the ignition switch being shown in elevation.

Figure 3 is a face view of the cap portion of the locking device.

Figure 4 is a section substantially along the line 4—4 of Figure 1,

Figure 5 is a perspective view of a shackle bolt which is comprised in the locking device.

Figure 6 is a view similar to Figure 1, showing a modified form of locking device.

In Figures 1 and 2 the numeral 1 designates a conventional automobile ignition switch having a laterally extending operating or handle portion 2. The ignition switch 1 protrudes from a supporting plate 3 which may be a part of the instrument board of an automobile, and the handle 2 is spaced from the supporting plate 3 as is usual so that it can swing without frictionally engaging the supporting plate. The switch 1 is provided with the usual central keyhole 4 in which the ignition switch key can be inserted for operating the usual locking means (not shown) which may prevent or permit swinging of the handle 2 from the position shown in Figure 1. It will be understood that when the handle 2 is in the position shown in Figure 1, the ignition switch is in its "off" position, and the battery which the ignition switch controls is disconnected electrically both from the automobile engine cylinders and the magneto of the automobile.

My invention provides means for preventing any unauthorized person from inserting a key or instrument in the keyhole 4 for releasing the handle 2 for such movement as is required to connect the battery electrically with the automobile engine cylinders, when the device is operatively applied to the ignition switch in the manner illustrated in Figures 1, 2 and 3. The device can be detached from the ignition switch to permit manipulation of the handle 2 when a lock which is comprised in the device has been operated by means of the proper key. However, it will be manifest from the description of the device which will follow and from the illustration in the drawings that it will be practically impossible for an unauthorized person to forcibly displace the device from the ignition switch without such injury to the ignition switch as would preclude its use for the purpose for which it was provided or which would give evidence of the unauthorized use of the switch. A device embodying the invention in the form now preferred by me comprises a cap or cover portion 5 having an end portion thereof formed internally, as at 6, to snugly fit over the protruding ignition switch 1, the remaining portion of the cap or cover 5 fitting over the switch handle 2 so that the marginal edge portion of the cap or cover is in contact with the supporting plate 3 and the switch 1 and its handle 2 are completely housed by the supporting plate 3 and the cover 5. The switch handle 2 therefore cannot be manipulated by means of any instrument inserted between the cap or cover 5 and the supporting plate 3 when the cap or cover is in place, as shown in Figures 1, 2 and 4.

The device also includes a substantially U-shaped fastening or shackle bolt having a web portion 7 adapted to slide between the switch handle 2 and the supporting plate 3 and having a pair of arms which straddle the switch arm 2 and extend through apertures 9 in the crown or outer side of the cap or cover 5. The arms 8 are provided at the outer ends of the apertures 9 with aligned transverse openings 10 for the reception of the shackle 11 of a padlock 12, whereby the cap or cover 5 will be held against the supporting plate 3 and in position to cooperate with the latter to house the switch 1 and the switch handle 2. In order to prevent complete displacement of the shackle bolt 7—8—8 from the cap or cover 5 when the padlock shackle 11 has been displaced from the opening 10 and the device has been removed from the switch 1 and its handle, one of the arms 8 of the shackle of the device may be formed with a bendable lug 13 which may be bent to position to extend across the extremities of the arms 8 of the shackle of the device after the arms 8 have been extended through the apertures 9.

It is to be understood that any suitable known locking means may be associated with the arms 8 of the shackle of the device to prevent outward movement of the cap or cover of the device when the device is in locking position. In Figure 6, I show a modified form of the device having means other than that hereinbefore described for locking the cover or cap of the device in place. In the modification shown in Figure 6, the cap or cover of the device is indicated at 15 and is provided with apertures 16 in its crown or outer portion through which arms 17 of the shackle of the modified form of the device may extend. The cap or cover 15 is formed to provide a casing at 18 for any suitable known type of locking mechanism having a lock bolt 19 movable to and from position to extend through aligned transverse openings 20 in the arms 17 of the shackle of the device. The locking mechanism within the casing 18 may be adapted to be operated in any suitable known manner, as by means of a key, not shown, inserted in a keyhole 21 in the lock casing 18.

When the cap or cover which the invention provides is secured in place by means such as hereinbefore described, the ignition switch cannot be manipulated by an authorized person until the cap or cover of the device has been displaced, and as hereinbefore stated, the cap or cover of the device cannot be displaced until the locking means which holds the cap or cover in place has been operated by the proper key or until the device has been broken by force which not only will be difficult of accomplishment, with the facilities ordinarily available for use by a person seeking to operate an automobile equipped with the switch without authority but moreover the forcible displacement of the cover of the device will injure the switch and probably prevent its subsequent operation.

I claim:—

1. A locking device for a switch having a laterally extending handle, said device comprising a cap adapted to fit over the switch and its handle, said cap having a pair of spaced apertures, a U-shaped fastening member having a web portion adapted to engage under the switch handle and having arms adapted to straddle the handle and to extend through the apertures in the crown portion of the cap, said arms having aligned openings in their outer end portions adapted for the reception of a retaining element for preventing outward displacement of said cap on said arms.

2. A locking device for a switch having a laterally extending handle, said device comprising a cap adapted to fit over the switch and its handle, said cap having a pair of spaced apertures, a U-shaped fastening member having a web portion adapted to engage under the switch handle and having arms adapted to straddle the handle and to extend through the apertures in the crown portion of the cap, and means engageable with the outer end portions of said arms for preventing outward displacement of said cap on said arms.

3. A locking device for an ignition switch having a laterally extending operating handle, said locking device comprising a cap adapted to fit over the switch and the handle, a substantially U-shaped fastening member having the web portion thereof adapted to engage under the handle and having arms adapted to straddle the handle and to extend through apertures in the crown portion of said cap, said arms having aligned transverse openings in the outer end portions thereof, and a lock having a retaining element, adapted to be moved to and from position to extend through said aligned openings, as and for the purpose described.

4. The combination of a supporting plate, and a switch protruding from said plate, said switch having a laterally extending handle portion spaced from the plate, of a cap fitting over a switch and handle against said plate, said plate having a pair of spaced apertures in the crown portion thereof, a substantially U-shaped fastening member having a web portion adapted to engage under said handle and having arms adapted to straddle said handle and to extend through said apertures in the crown portion of the cap, and means releasably engageable with the outer end portions of said arms for preventing outward displacement of said cap on said arms.

5. A locking device for a switch having a laterally extending handle, said device comprising a cap adapted to fit over the switch and its handle, said cap having a pair of spaced apertures, a U-shaped fastening member having a web portion adapted to engage under the switch handle and having arms adapted to straddle the handle and to extend through the apertures in the crown portion of the cap, one of said arms having a portion at its extremity bendable toward the other of said arms, and means engageable with the outer end portions of said arms for preventing outward displacement of said cap on said arms.

FRANK LOCKYER.